US006314894B1

(12) United States Patent
Gatley, Jr.

(10) Patent No.: US 6,314,894 B1
(45) Date of Patent: Nov. 13, 2001

(54) FURNACE BLOWER HOUSING WITH INTEGRALLY FORMED EXHAUST TRANSITION

(75) Inventor: William Stuart Gatley, Jr., Cassville, MO (US)

(73) Assignee: Jakel Incorporated, Highland, IL (US)

( * ) Notice: Subject to any disclaimer, the term of this patent is extended or adjusted under 35 U.S.C. 154(b) by 0 days.

(21) Appl. No.: 09/651,645

(22) Filed: Aug. 30, 2000

(51) Int. Cl.[7] ...................................................... F03D 11/00
(52) U.S. Cl. ............................ 110/341; 110/162; 415/207
(58) Field of Search ..................................... 110/205, 206, 110/214, 297, 147, 162, 341; 415/182.1, 203, 206, 224, 207

(56) References Cited

U.S. PATENT DOCUMENTS

| | | | | |
|---|---|---|---|---|
| 87,625 | * | 3/1869 | Bookwalter | 415/182.1 |
| D. 263,839 | * | 4/1982 | Somme | D15/7 |
| 4,247,250 | | 1/1981 | Lipe et al. . | |
| 5,040,943 | | 8/1991 | Dwyer et al. . | |
| 5,112,190 | | 5/1992 | Kajiwara et al. . | |
| 5,133,642 | | 7/1992 | Kajiwara . | |
| 5,310,310 | | 5/1994 | Nakatsukasa et al. . | |
| 5,358,380 | | 10/1994 | Arakawa . | |
| 5,414,999 | * | 5/1995 | Barnes | 60/722 |
| 5,820,458 | | 10/1998 | Lai . | |
| 5,864,190 | | 1/1999 | Bacchiocchi . | |
| 5,951,245 | * | 9/1999 | Sullivan | 415/192 |
| 5,997,246 | * | 12/1999 | Humbad | 415/119 |
| 6,155,781 | * | 12/2000 | Tsai | 415/206 |
| 6,206,633 | * | 3/2001 | Nakamura et al. | 415/151 |

* cited by examiner

*Primary Examiner*—Henry Bennett
*Assistant Examiner*—K. B. Rinehart
(74) *Attorney, Agent, or Firm*—Howell & Haferkamp LC

(57) ABSTRACT

A furnace blower housing has a two-piece exhaust transition, one piece of which is an integral extension of the blower housing, that transitions a rectangular cross section outlet of the blower housing to a circular cross section outlet of the exhaust transition that is adapted to be attached to a circular exhaust pipe.

18 Claims, 6 Drawing Sheets

FURNACE BLOWER HOUSING WITH INTEGRALLY FORMED EXHAUST TRANSITION

BACKGROUND OF THE INVENTION (i) Field of the Invention

The present invention relates in general to blower housings used in furnaces to remove the products of combustion and particularly to the exhaust transition of the blower housing. The blower housing includes an integrally formed portion of the exhaust transition and is of a two-piece construction.

(ii) Description of the Related Art

Furnaces utilize a blower to induce a draft through the furnace to draw the heated air and the products of combustion through a heat exchanger and exhaust them through an exhaust pipe. The blower housings used in prior art furnaces are typically made of sheet metal and have an exhaust port that is rectangular. However, the exhaust pipe to which the blower exhaust port is to be connected is usually circular in cross-section. Therefore, to accomplish the transition from a rectangular exhaust port to a circular exhaust pipe inlet, a transition piece is attached to the blower housing that converts the rectangular exhaust port into a circular exhaust port that can be connected to the circular exhaust pipe. The transition piece has opposite first and second ends. The first end is rectangular and is adapted to be attached to the rectangular exhaust port on the blower housing. The second end is circular and is adapted to allow connection to a circular exhaust pipe.

The transition pieces are typically made of cast aluminum. Cast aluminum exhaust transition pieces are expensive to manufacture and increase the costs of the blower assembly and the associated furnace within which the blower assembly is utilized.

Additionally, the prior art exhaust transition pieces are often attached to the rectangular blower housing exhaust ports by screws. Usually, three or four sheet metal screws are used to attach an exhaust transition piece to the exhaust port of the blower housing. Because the exhaust transition piece is attached to the exhaust port for the blower housing by screws, the labor to attach the transition piece adds to the cost of the blower assembly. Furthermore, because the exhaust transition piece is only secured to the blower housing by three or four screws, the connection often becomes loose over time and the exhaust transition piece may rattle or produce undesirable noise when the blower is being run.

Therefore, what is needed is an exhaust transition piece that is less expensive to manufacture, less labor intensive to install, and reduces the possibility of rattling.

SUMMARY OF THE INVENTION

The present invention overcomes the shortcomings of prior art cast aluminum transition pieces by providing an exhaust transition having a portion that is integrally formed with the blower housing and is of a two-piece construction that is considerably less expensive to manufacture. The exhaust transition is also less likely to rattle and requires less labor to assemble.

The blower housing and exhaust transition of the invention is comprised of a blower housing body and a discharge pipe that is comprised of first and second sections. The first section of the discharge pipe is a part of the blower housing body and is a one-piece construction with the body. The second section of the discharge pipe is adapted and configured to attach to the first section of the discharge pipe to produce the tubular configuration of the pipe. The discharge pipe has first and second ends and a length between the ends. The first end of the discharge pipe is an inlet and is adjacent the body. The second end of the discharge pipe is an outlet and is generally circular in cross-section. When the second pipe section is attached to the first pipe section, the discharge pipe is formed and a circular outlet is created.

The inlet of the discharge pipe is generally rectangular in shape. The discharge pipe transitions from being generally rectangular in shape at the inlet to being generally circular in shape at the outlet. The transition is made progressively along the length of the pipe.

In variations of the blower housing and exhaust transition, the inlet is not always generally rectangular in cross-section. The blower housing may have a portion of the body adjacent the inlet that curves or bows outwardly from the body as the portion of the body extends towards the pipe inlet. With the body having a portion that curves outwardly as it approaches the inlet, the first discharge pipe section will also curve or bow outwardly from the body as it extends from its inlet end to its outlet end so that it is aligned with and complementary to the curved portion of the body. In essence, this configuration of the blower housing begins the transition to the generally circular outlet prior to the inlet to the discharge pipe.

The blower housing body is formed with front and back walls connected together by a generally volute sidewall. The back wall has an opening that leads to the interior of the body. The interior is defined by the front and back walls and the sidewall. The interior is configured and adapted to receive a fan which rotates within the interior and generates a flow of air through the housing. A throat in the body leads to the exhaust transition. The transition is comprised of first and second sections and forms an outlet through which the flow of air leaves the housing. The first transition section is formed as part of the body and creates a first portion of the outlet. The second transition section forms a second portion of the outlet and is complementary to the first transition section. The second transition section is configured and adapted to attach to the first transition section by crimping the second transition section to the first transition section.

The two piece blower housing and exhaust transition of the present invention overcomes the disadvantages of the prior art. The invention provides for one of the exhaust transition sections to be part of the body. This piece is formed when the body is stamped and is formed of the same material as the body. Additionally, the second piece is also preferably formed of the same material as the body. Because the body is typically made of sheet metal, the first and second pieces of the exhaust transition are also made of sheet metal, which is significantly less expensive than the prior art transition pieces which are made of cast aluminum. The two pieces of the exhaust transition can be attached to one another by crimping one to the other. The crimping provides for a tight connection that will resist rattling better than the prior art use of sheet metal screws in attaching the transition piece to the body. Finally, the process of crimping is less labor intensive and further reduces the costs of manufacturing the housing over that of the prior art.

BRIEF DESCRIPTION OF THE DRAWINGS

Further objectives and features of the present invention are set forth in the following detailed description of the preferred embodiment of the invention and in the drawing figures wherein.

DETAILED DESCRIPTION OF THE INVENTION

The use of the terms substantially and generally in the specification are meant to convey approximate shapes and orientations. The terms are not meant to limit the invention to precisely the shapes and orientations recited.

Figure 1:
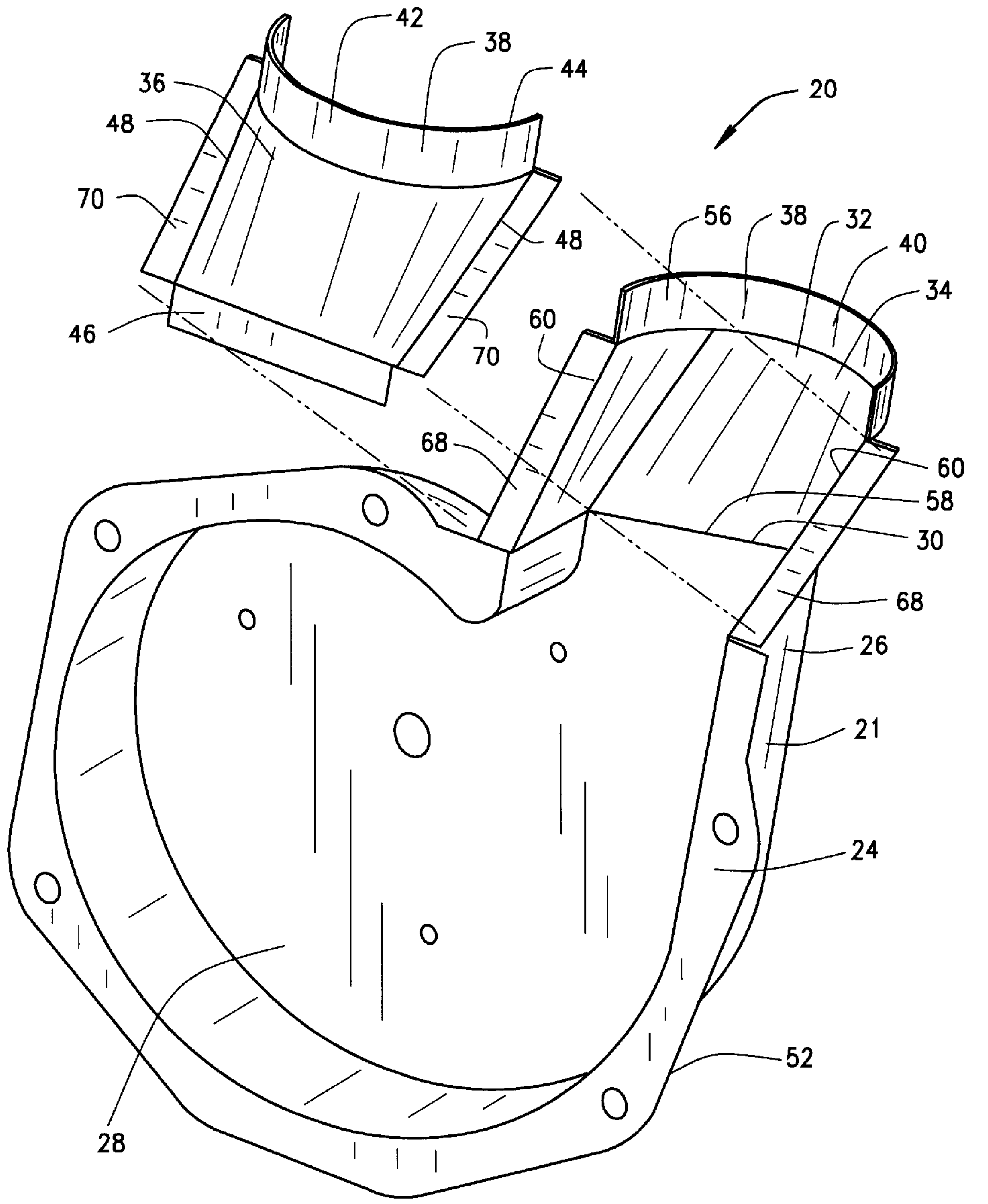
FIG. 1 is a perspective view of a blower housing of the present invention.

FIG. 1 shows the blower housing of the invention with the integrally formed portion of the exhaust transition generally indicated as 20. The housing 20 has a body 21 having a front wall 22 and a back wall or flange 24. A sidewall 26 extends between the front and back walls 22, 24. The sidewall 26 has a volute shape, which is typical of furnace blower housings and well known in the industry. The body 21 has a interior cavity 28 that is defined by the front and back walls 22, 24 and the sidewall 26. The cavity 28 is configured and adapted to house a fan (not shown) that rotates within the cavity 28 to generate a flow of air through the blower housing 20. The body 21 has a throat 30 that leads to an exhaust transition which is generally indicated as 32. The exhaust transition 32 is comprised of first and second sections 34, 36. The transition 32 has an outlet 38 through which the flow of air exits the blower housing 20. The outlet 38 is generally circular in shape so that the blower housing 20 can be attached to a circular exhaust pipe (not shown) that is standard in the industry. The first transition section 34 is integral to the body 21. The body 21 and the first transition section 34 are manufactured as a single piece. The first transition section 34 forms a first portion 40 of the outlet 38 of the exhaust transition. The second transition section 36 forms a second portion 42 of the outlet 38 of the exhaust transition. The second transition section 36 is complementary to the first transition section 36 and is designed to be attached to the first transition section 34. When the first and second transition sections 34, 36 are attached, the exhaust transition 32 and the outlet 38 are formed.

When the fan is rotating within the cavity 28, the flow of air will enter the cavity 28 and flow within the cavity 28 along the sidewall 26 and through the throat 30 and into the transition section 32. The flow of air exits the transition section 32 through the outlet 38.

The body 21 of the blower housing 20 is typically made of galvanized sheet metal. The body 21 is formed by stamping the sheet metal into the desired shape. Because the exhaust transition 32 is comprised of separate first and second sections 32, 34, the first transition section 32 is preferably manufactured as a single, monolithic piece with the body 21. Preferably, the first transition section 34 is formed extending from the sidewall 26 and the front wall 22 of the body 21. The second transition section 34 is also preferably manufactured of stamped sheet metal. This eliminates the need for the prior art cast aluminum transition piece. The cost to manufacture the prior art cast transition piece is on the magnitude of four times the cost to produce the integral exhaust transition of the invention. While the invention has been described as being made out of galvanized sheet metal, it should be understood that other materials may be utilized without departing from the scope of the invention as defined by the claims.

Preferably, the exhaust transition 32 extends away from the back wall 24 as the exhaust transition 32 extends outwardly from the body 21. The exhaust transition 32 thereby spaces the outlet 38 from the back wall 24 and allows the blower housing back wall 24 to be attached to a furnace in the manner typical in the industry.

Figure 2:
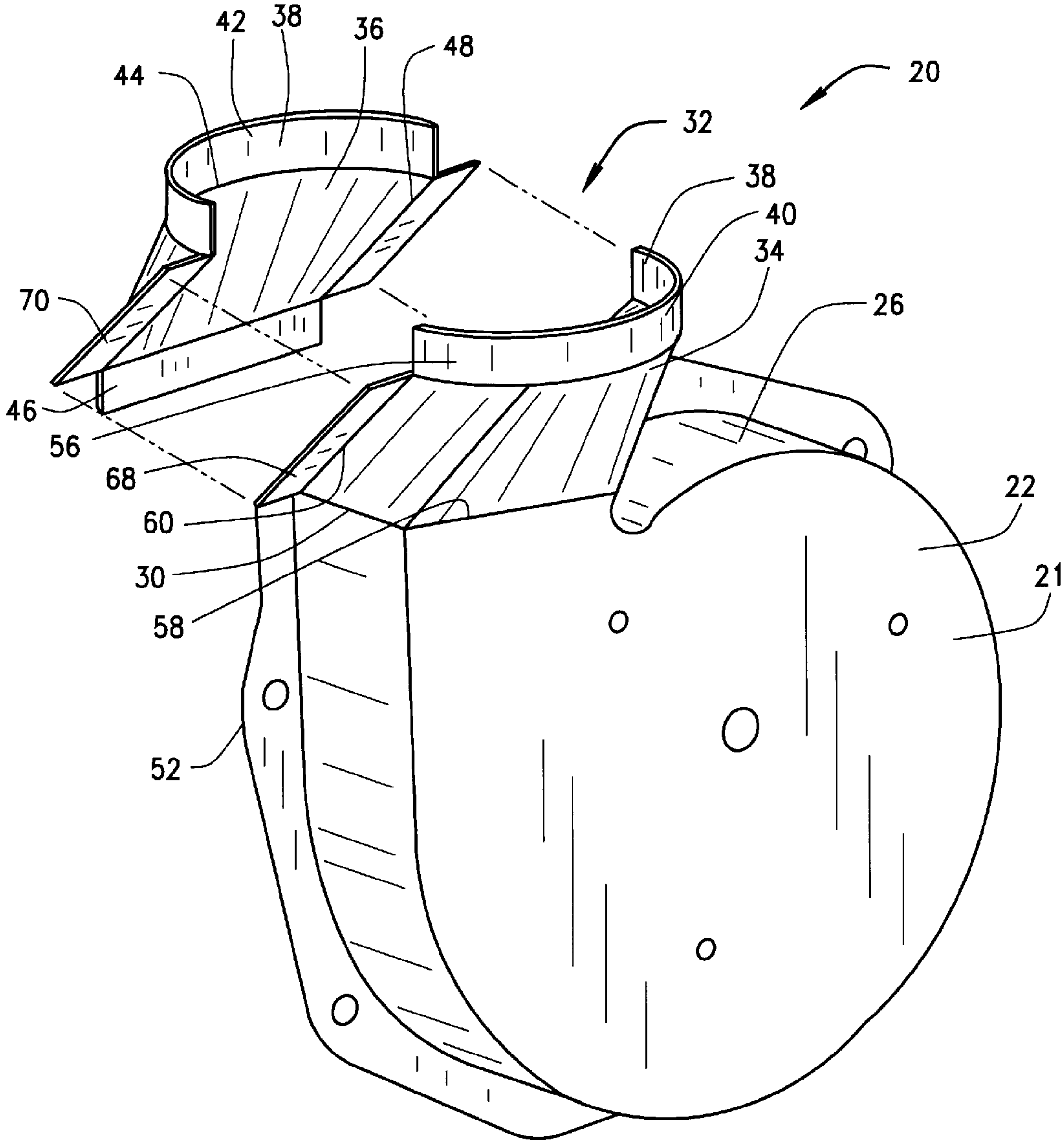
FIG. 2 is a perspective view of the opposite side of the housing of FIG. 1.
Figure 3:
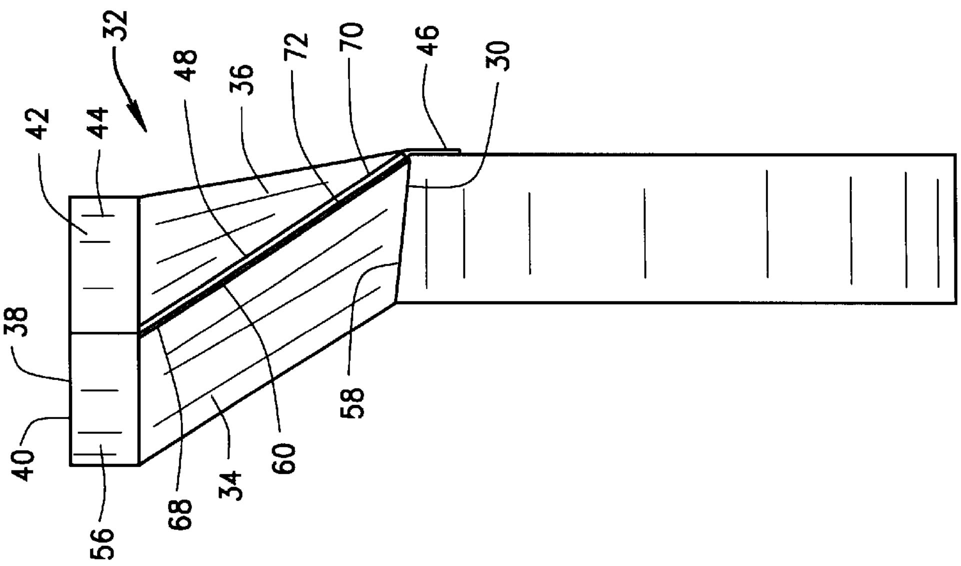
FIG. 3 is a side elevational view of the housing of FIG. 1.

Preferably, the second transition section 36 has opposite outlet and inlet ends 44, 46 and opposite side edges 48. The inlet end 46 is a substantially flat flange and is generally positioned in the same plane as the back wall or flange 24 of the body 21 when attached to the blower housing 20. To form the generally circular outlet 38, the second transition section 36 between the opposite side edges 48 progressively curves or bows outwardly as seen in FIGS. 1–3 as the second transition section 36 extends from its inlet end 46 to its outlet end 44. The arcuate shape of the second transition section outlet end 44 thereby forms the second portion 42 of the outlet 38.

Figure 7:
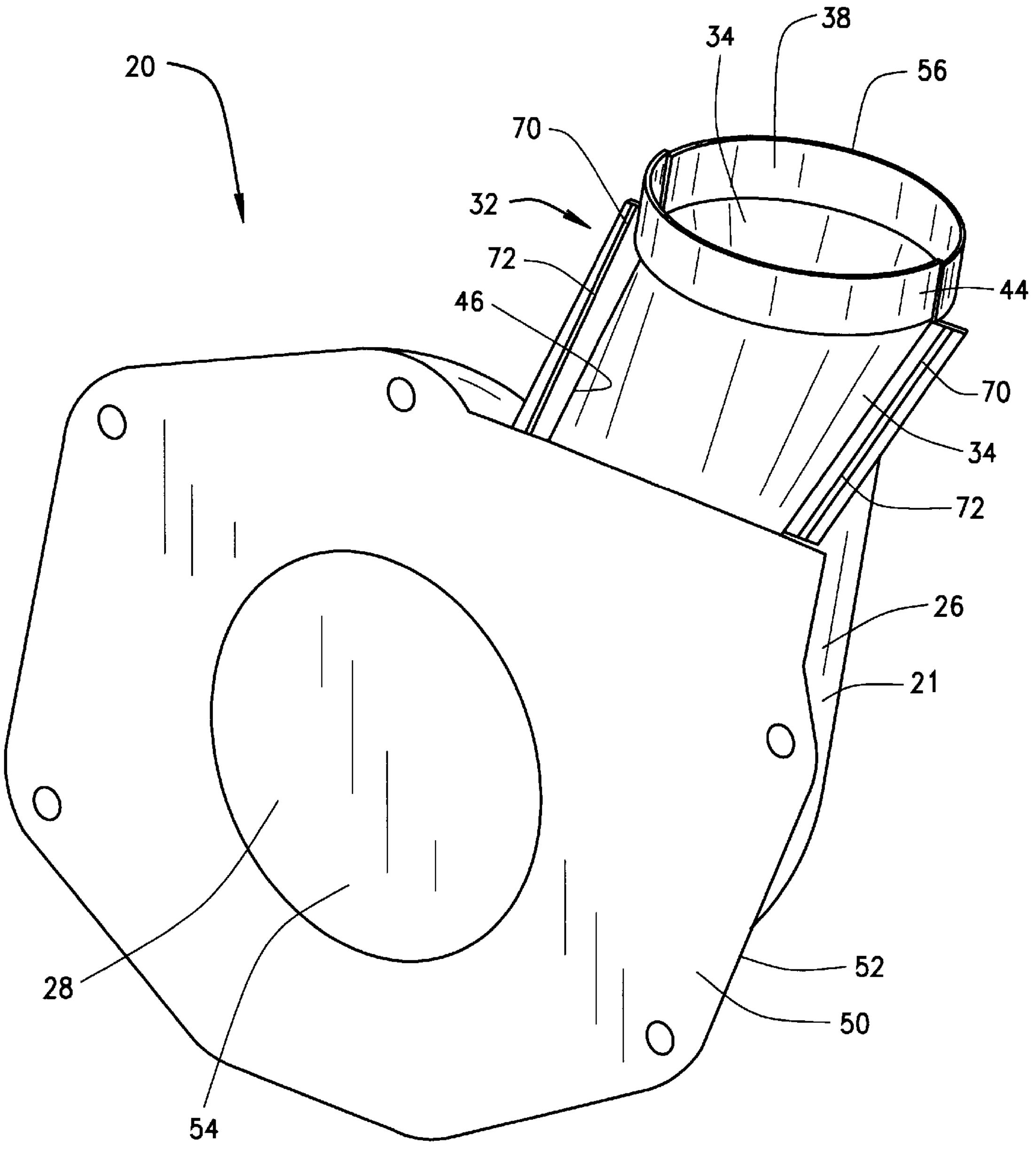
FIG. 7 is a perspective view of the blower housing of the present invention showing the transitional section attached to the housing and covering the housing interior

As an alternative, the inlet end 46 of the second transition section 36 can be formed as a back plate 50 that covers the cavity 28, as shown in FIG. 7. The back plate 50 attaches to the back wall or flange 24 along its peripheral edge 52. The back plate 50 has an opening 54 to allow the flow of air to be drawn into the cavity 28 of the blower housing 20 by the fan. Preferably, the back plate 50 would be attached to the back wall 24 by crimping the back plate 50 the back wall 24 along the peripheral edge 52 of the back wall 24. However, it should be understood that other methods of attaching the back plate 50 to the back wall 24 can be utilized without departing from the scope of the invention as defined by the claims.

Preferably, the first transition section 34 has opposite outlet and inlet ends 56, 58 and opposite side edges 60. The outlet end 56 of the first transition section 34 forms the first portion 40 of the outlet 38 and the inlet end 58 of the first transition section 34 is part of the throat 30. To form the generally circular outlet 38, the first transition portion 34 between the opposite edges 60 progressively curves or bows outwardly as seen in FIGS. 1–3 as the first transition section 34 extends from its inlet end 58 to its outlet end 56.

Figure 6:
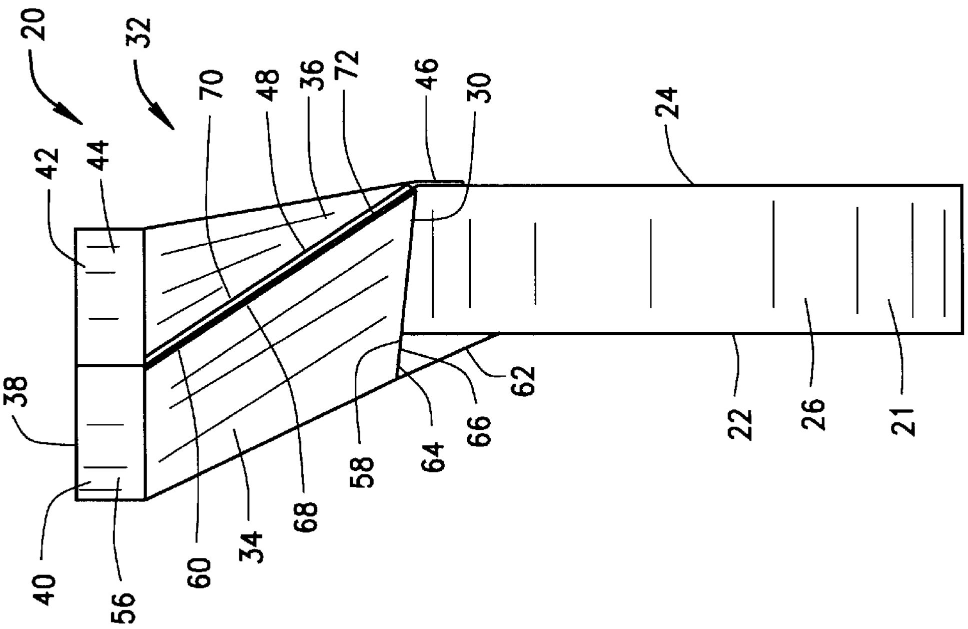
FIG. 6 is a side elevational view of the housing of FIG. 4.
Figure 4:
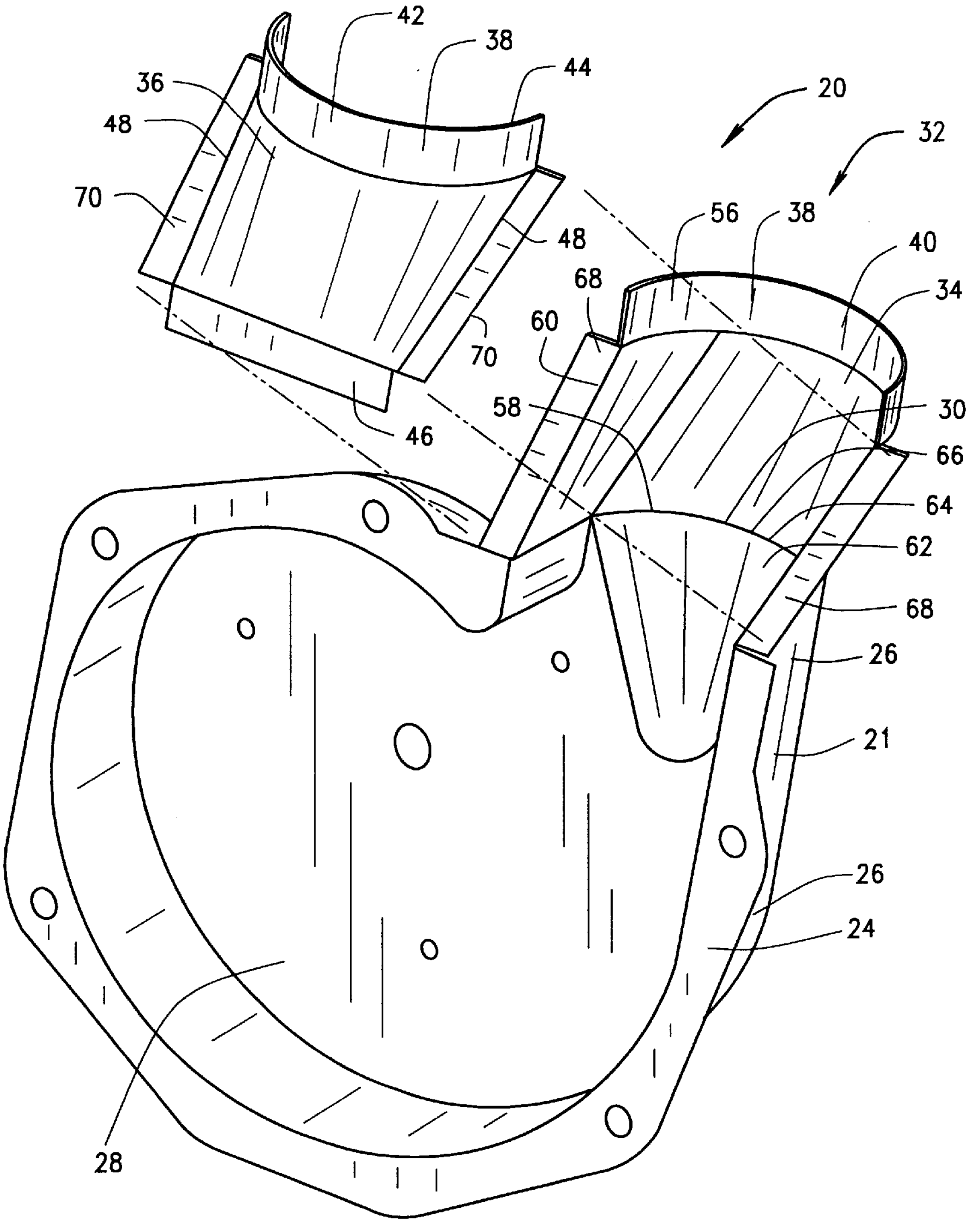
FIG. 4 is a perspective view of a blower housing of the present invention showing the front wall of the housing with a pretransitional section.
Figure 5:
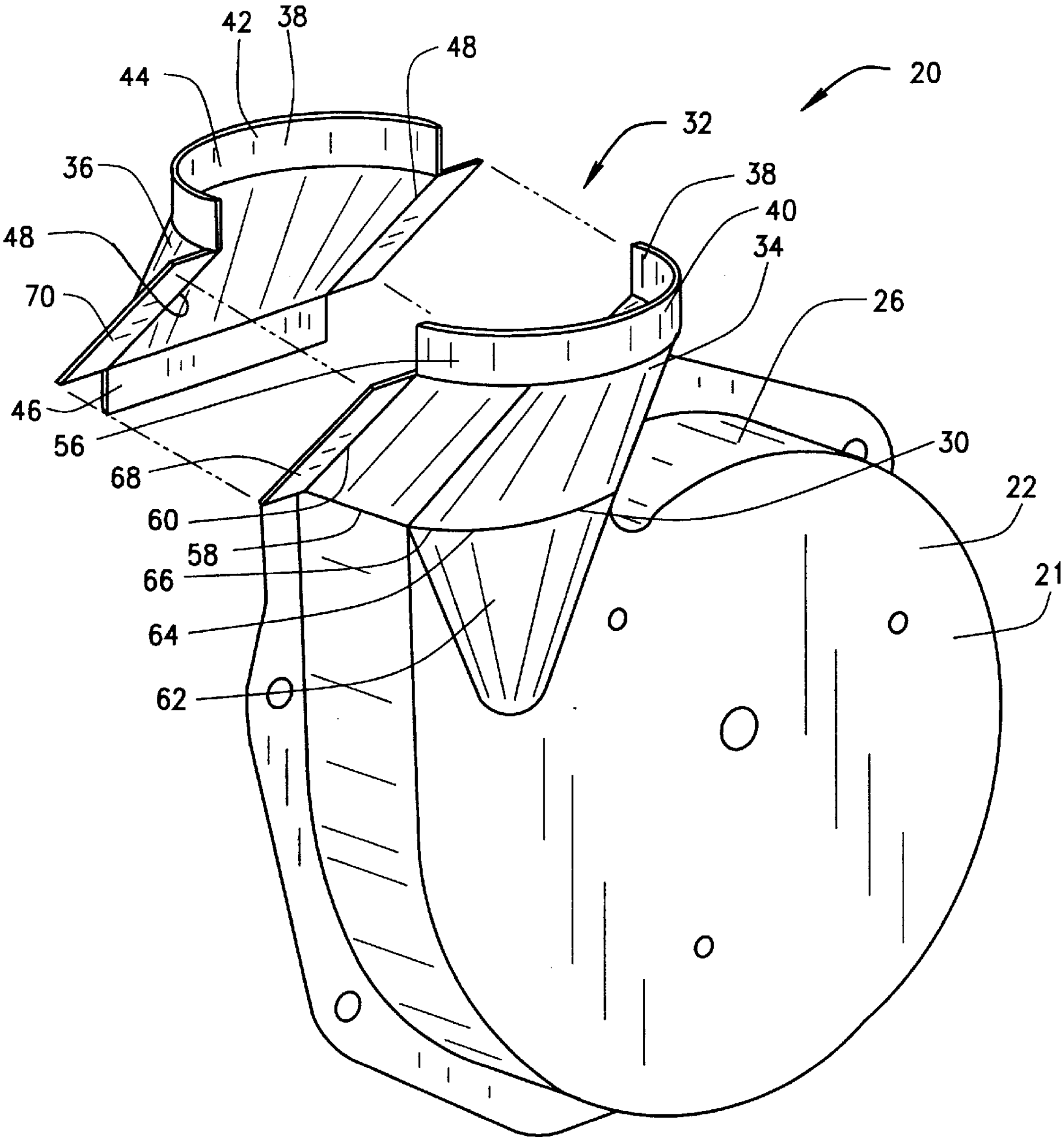
FIG. 5 is a perspective view of the opposite side of the housing of FIG. 4.

The body 21, as can be seen in FIGS. 4, 5 and 6, can have a pretransition section 62 on a portion of the front wall 22 that leads to the exhaust transition 32. The pretransition section 62 is adjacent the throat 30 and the first transition section inlet end 58. The pretransition section 62 progressively curves outwardly from the front wall 22 as the pretransition section 62 extends toward the throat 30. A portion 66 of the throat 30 adjacent the pretransition section 62 and a portion 66 of the first transition section inlet end 58 adjacent the throat portion 64 are curved axially outwardly from the front surface 22.

Preferably, the side edges 60 of the first transition section 34 have attachment members or flanges 68 and the side edges 48 of the second transition section 36 have attachment members or flanges 70 that are complementary to each other. The first and second transition sections 34, 36 are attached to each other by the respective attachment members 68, 70.

Preferably, the attachment members 68, 70 are attached together by crimping 72 or bending and folding the attachment members over each other, thereby forming a secured, sealed connection between the two transition sections. However, it should be understood that while the first and second transition sections 34, 36 have been shown and discussed as being attached together by crimping, other means of fastening can be employed without departing from the scope of the invention as defined by the claims.

Furthermore, while the first and second transition sections 34, 36 have been shown and described as progressively curving to form the generally circular outlet 38, it should be understood that the first and second transition portions 34, 36 are not required to be progressively curving to be within the scope of the invention as defined by the claims. For instance, step changes and the like can be employed to cause the transition section 32 to go from being generally rectangular to generally circular and still be within the scope of the invention.

While the present invention has been described by reference to specific embodiments, it should be understood that modifications and variations of the invention may be constructed without departing from the scope of the invention as defined by the following claims.

What is claimed is:

1. A method of transitioning a furnace blower housing outlet so that the housing can be directly attached to a circular exhaust pipe, the method comprising the steps of:

providing the blower housing with an exhaust transition having an inlet adjacent the housing, a circular outlet, and a length therebetween, the exhaust transition being comprised of first and second sections;

forming the first section as a unitary piece of the housing;

forming the second section complementary to the first section and adapted and configured to attach to the first section to form the exhaust transition and the circular outlet;

attaching the second section to the first section; and, the exhaust discharge is formed with a generally rectangular inlet and progressively changes from being generally rectangular at the inlet to being generally circular at the outlet.

2. The method of claim 1, wherein the step of attaching the second section to the first pipe section is further comprised of the step of:

crimping the second section to the first section.

3. A furnace blower housing comprising:

a body having a tubular exhaust transition, the exhaust transition being comprised of first and second sections and having first and second ends and a length therebetween;

the first end being an inlet, the inlet being adjacent to the body;

the second end being an outlet the outlet being generally circular;

the first section being of single piece construction with the body and the second section being adapted and configured to attach to the first section to form the tubular exhaust transition and the circular outlet; and the first end is generally rectangular and the exhaust transition changes from being generally rectangular at the first end to being generally circular at the second end as the exhaust transition extends from the first end to the second end.

4. The housing of claim 3, wherein:

the second section extends along the entire length of the exhaust transition from the inlet to the outlet and has an inlet end that is generally flat and forms a portion of the generally rectangular inlet.

5. The housing of claim 4, wherein:

the second section inlet end covers a back wall of the body and has an opening to allow air to flow into the housing.

6. A furnace blower housing comprising:

a body having a front wall and a back wall separated by a volute side wall, the back wall having an opening that leads to a cavity in the body defined by the front and back wall and the side wall;

the cavity being configured and adapted to receive a fan that is rotated in the cavity to generate a flow of air through the housing;

a throat in the body leading to an exhaust transition comprised of first and second sections, the exhaust transition forming an outlet of the blower housing and having an inlet end with a rectangular cross sectional area and an outlet with a circular cross sectional area;

the first exhaust transition section being formed monolithically from the body and forming a first portion of the outlet;

the second exhaust transition section forming a second portion of the outlet, the second exhaust transition section being complementary to the first exhaust transition section and configured and adapted to attach to the first exhaust transition section to form the exhaust transition and the outlet; and the flow of air exits the housing through the exhaust transition and the outlet.

7. The housing of claim 6, wherein:

the first and second transition sections form a generally circular outlet.

8. The housing of claim 7, wherein:

the first transition section is formed from the sidewall and the front wall of the body.

9. The housing of claim 6, wherein:

the second transition section has opposite outlet and inlet ends and opposite side edges, the second transition section is substantially flat and generally parallel to the back wall at the inlet end and progressively curves outwardly between the opposite side edges as the second transition section extends from the inlet end to the outlet end to form the second portion of the generally circular outlet.

10. The housing of claim 9, wherein:

the inlet end forms a back plate that attaches to the back wall and covers the opening in the back wall, the back plate having an opening to allow air to enter the cavity through the back plate opening.

11. The housing of claim 6, wherein:

the first transition section has opposite outlet and inlet ends and opposite side edges, the outlet end being the first portion of the outlet and the inlet end being part of the throat, the first transition section progressively curves outwardly between the opposite side edges as the first transition section extends from the inlet end to the outlet end to form the first portion of the generally circular outlet.

12. The housing of the claim 11, wherein:

a portion of the front wall forms a pretransition section adjacent the throat and the inlet end, the pretransition section progressively curves outwardly from the front wall as the pretransition section extends towards the throat and the inlet end, and a portion of the throat adjacent the pretransition section and a portion of the inlet end adjacent the throat are curved outwardly from the front wall and align with and are complementary to the pretransition section.

13. A furnace blower housing comprising:

a body having a front wall and a back wall separated by a volute side wall, the back wall having an opening that leads to a cavity in the body defined by the front and back wall and the side wall;

the cavity being configured and adapted to receive a fan that is rotated in the cavity to generate a flow of air through the housing;

a throat in the body leading to an exhaust transition comprised of first and second sections, the exhaust transition forming an outlet;

the first exhaust transition section being formed monolithically from the body and forming a first portion of the outlet;

the second exhaust transition section forming a second portion of the outlet, the second exhaust transition section being complementary to the first exhaust transition section and configured and adapted to attach to the first exhaust transition section to form the exhaust transition and the outlet;

the flow of air exits the housing through the exhaust transition and the outlet;

the first and second transition sections form a generally circular outlet;

the first transition section is formed from the side wall and the front wall of the body;

the exhaust transition extends axially away from the back wall as the transition section extends outwardly from the body so that the outlet is spaced from the back wall; and the first transition section has opposite outlet and inlet ends and opposite side edges, the first transition section side edges having attachment members;

the second transition section has opposite outlet and inlet ends and opposite side edges, the second transition section side edges having attachment members complementary to the first transition section attachment members; and the second transition section attaches to the first transition section along the first and second transition section attachment members.

14. The housing of claim 13, wherein:

the second transition section attachment members are crimped to the first transition section attachment members.

15. The housing of claim 3, wherein:

the second section has a back plate that attaches to the body.

16. The housing of claim 6, wherein:

the second transition section has opposite outlet and inlet ends and opposite side edges, and the inlet end of the second transition section is formed with a back plate that attaches to the back wall and covers the opening in the back wall, the back plate having an opening to allow air to enter the cavity through the back plate opening.

17. The housing of claim 13, wherein:

the second transition section has opposite outlet and inlet ends and opposite side edges, and the inlet end of the second transition section is formed with a back plate that attaches to the back wall and covers the opening in the back wall, the back plate having an opening to allow air to enter the cavity through the back plate opening.

18. The housing of claim 13, wherein:

a portion of the front wall forms a pretransition section adjacent the throat and the inlet end, the pretransition section progressively curves outwardly from the front wall as the pretransition section extends toward the throat and the inlet end, and a portion of the throat adjacent the pretransition section and a portion of the inlet end adjacent the throat are curved outwardly from the front wall and align with and are complementary to the pretransition section.

* * * * *